United States Patent
Gleasman et al.

(10) Patent No.: US 6,748,817 B2
(45) Date of Patent: Jun. 15, 2004

(54) TRANSMISSION WITH MINIMAL ORBITER

(75) Inventors: James A. Gleasman, Rochester, NY (US); Keith E. Gleasman, Fairport, NY (US); Vernon E. Gleasman, Pittsford, NY (US)

(73) Assignee: Torvec, Inc., Pittsford, NY (US)

( * ) Notice: Subject to any disclaimer, the term of this patent is extended or adjusted under 35 U.S.C. 154(b) by 85 days.

(21) Appl. No.: 10/229,785

(22) Filed: Aug. 28, 2002

(65) Prior Publication Data

US 2003/0154809 A1 Aug. 21, 2003

Related U.S. Application Data

(60) Provisional application No. 60/357,612, filed on Feb. 15, 2002.

(51) Int. Cl.[7] .............................................. F16D 27/10
(52) U.S. Cl. ........................... 74/125.5; 74/113; 74/114
(58) Field of Search ........................... 74/111, 112, 114, 74/113, 125.5

(56) References Cited

U.S. PATENT DOCUMENTS

| | | | |
|---|---|---|---|
| 1,984,830 A | 12/1934 | Higley | 180/17 |
| 4,282,772 A | * 8/1981 | Franch | 475/14 |
| 4,776,235 A | 10/1988 | Gleasman et al. | 74/720.5 |
| 4,895,052 A | 1/1990 | Gleasman et al. | 74/720.5 |
| 5,170,872 A | * 12/1992 | Salicini | 192/48.2 |
| 5,186,692 A | 2/1993 | Gleasman et al. | 475/82 |
| 5,390,751 A | 2/1995 | Puetz et al. | 180/6.48 |
| 6,342,021 B1 | 1/2002 | Gleasman et al. | 475/18 |

* cited by examiner

*Primary Examiner*—David Fenstermacher
(74) *Attorney, Agent, or Firm*—Morton A. Polster

(57) ABSTRACT

A transmission has only a single, minimal orbiter in which an input gear and an output gear, each being connected to separate input and output shafts, are interconnected through an orbiting cluster gear that meshes with only the input and output gears. The cluster gear is carried by a web that is itself rotated by a hydraulic control motor through a first clutch. When rotation of the web is prevented, rotation of the input gear produces rotation of the output gear at a predetermined reduction of the input drive, this gear reduction being continuously diminished proportional to the speed of rotation of the web in a first direction. When the vehicle reaches highway speeds, the control motor is disconnected and a second clutch is activated to connect a predetermined overdrive that is located between the engine drive and the transmission rather than being conventionally positioned between the transmission and the final output shaft.

17 Claims, 3 Drawing Sheets

TRANSMISSION WITH MINIMAL ORBITER

This application claims the benefit of U.S. Provisional Application No. 60/357,612, filed on Feb. 15, 2002, which provisional application is incorporated by reference herein.

TECHNICAL FIELD

This invention relates generally to transmissions for varying the output torque of engines and, preferably, to an automotive transmission of the type in which the torque and speed of an engine drive can be continuously and infinitely varied from vehicle start-up through normal highway driving.

BACKGROUND

All commercial automotive transmissions are large, complex, and wasteful of fuel and, particularly when used with diesel engines, cause serious problems in air pollution. The relative inefficiency of commercial automatic transmissions, with their torque converters, has made them a principal object for needed improvement for more than 60 years. The prior art is replete with variations of multiple planetary and orbital gearing concepts for automatic automotive transmissions in which output speed is continuously varied serially through each of a plurality of stepped gear ratios.

When a vehicle such as a loaded truck begins to accelerate (e.g., from a standing stop), the speed of the engine drive changes repetitively as it moves the vehicle's conventional transmission (either manual or automatic) through successive gear changes. Each such repetitive speed change results in the inefficient discharge of unburned fuel and, particularly with diesel engines, the generation of undesirable and unhealthy pollutants. Therefore, many new transmission designs are being suggested and tried in the hope of finding some way to increase engine efficiency and reduce pollutants. Among these designs are proposals for infinitely variable transmissions incorporating input and output drive cones or toroidal surfaces (as distinguished from gears) being connected by drive belts or by a lubricant that increases frictional traction between the elements. The former are limited to relatively small vehicles, while the latter have not as yet achieved any commercial success.

Fairly recently, a new continuously and infinitely variable automotive transmission ("IVT") was disclosed in U.S. Pat. No. 5,186,692 (Gleasman et al.). This just-cited Gleasman IVT connects an engine drive to an output shaft by an orbital drive (similar to that used by Henry Ford in the Model T), and it infinitely varies gear ratios by controlling the rotation of a control gear in the orbiter with a separate hydraulic control motor actuated by a hydraulic pump. This just-cited Gleasman IVT is also smaller and lighter than commercial transmissions, and an experimental model was successfully tested using hydraulics to rotate the control gear of the orbital drive.

However, during the development of a commercial prototype for this just-cited Gleasman IVT, we suddenly realized that a significant improvement could be made by modifying the mechanism in a manner similar to new technology we had very recently developed in another automotive area, namely, the design of steer-drives for tracked vehicles. In one known group of steer-drives, a combination of two identical differentials is used to divide engine driving torque received from the output shaft of the vehicle's conventional transmission. (For instance, see U.S. Pat. No. 1,984,830 (Higley) and U.S. Pat. No. 5,390,751 (Puetz et al.).) In this type of steer-drive, the two identical differentials divide the driving torque into two individual drives, one for each track (or for each oversized wheel) of a large off-road vehicle. In our recent improvement to this known group of steer-drives, disclosed in U.S. Pat. No. 6,342,021 (Gleasman et al.), a pair of identical orbiters replaces the two differentials in a steer-drive that makes it possible to steer a tracked vehicle at highway speeds with a conventional steering wheel.

The above-identified Gleasman IVT, which is improved by the invention disclosed herein, has relatively small physical proportions and can be scaled up or down for use in smaller vehicles as well as large semi-trucks. Also, the tests of our earlier experimental prototype (referred to above) indicate that this IVT should significantly reduce the pollutants emanating from a diesel engine combined with this IVT.

The improved transmission disclosed herein incorporates the general format of the two identical orbiter differentials disclosed in our just-cited steer-drive patent. However, in this improvement, only a single orbiter is used in a new combination that includes a relatively minor but significant change that, if heretofore appreciated, could have been made to Ford's Model T transmission over 90 years ago. This minor change not only simplifies the orbiter mechanism of the IVT but, for automotive uses, provides a remarkable increase in efficiency and an even further reduction in size and weight.

SUMMARY OF THE INVENTION

The key element of this improved transmission is only a single, remarkably simple, minimal orbiter. Namely, an input gear and an output gear, being connected, respectively, to separate input and output shafts, are both mounted along the same first axis and interconnected through a cluster gear that meshes with only the input and output gears. The cluster gear is mounted for rotation on an orbit shaft that is positioned parallel with the first axis and carried by a web that is itself mounted for rotation about the first axis. The orbit shaft and the cluster gear orbit, respectively, both the first axis and the input and output gears.

The orbiting web of this minimal gear arrangement is connected to a control motor so that: (a) if the control motor prevents rotation of the orbiter web, the output gear rotates directly with the input drive but solely at a predetermined reduction of the input drive; (b) if the control motor is rotated in a first ("forward") direction, the predetermined reduction of the output gear relative to the input drive is diminished proportional to the speed that the control motor rotates the web; (c) if the control motor is rotated in the opposite ("rearward") direction at a predetermined relatively slow speed, the output gear comes to a stop, in effect providing a "geared neutral" in which torque is applied to the web to hold the vehicle in a stopped position for start-up and when stopping in traffic; and (d) finally, when the vehicle reaches highway speeds, the control motor is disconnected from the orbiter web which is then connected with the input drive shaft through a predetermined overdrive gear ratio that causes the transmission to rotate the output drive shaft faster than the engine drive by the predetermined overdrive.

This just-mentioned overdrive is located between the engine drive and the transmission rather than being conventionally positioned between the transmission and the final output shaft. Therefore, the overdrive of the invention is subjected only to engine torque rather than being subjected to the higher torque generated by the gear reductions of the transmission. Thus, the overdrive of the invention can be made substantially smaller and lighter, providing further reductions in weight and size when compared to conventional transmissions.

However, in regard to the just-mentioned "geared neutral" condition, working with experimental models has revealed a surprising and potentially valuable feature of this novel orbiter improvement: We have learned that, if the control motor is "neutralized" (e.g., by disengaging a clutch) when the engine drive is idling, the idling-speed rotation of the input gear will cause the cluster gear to rotate the web in the opposite direction at a speed that automatically causes the output gear to come to a stop. This automatically provides the required zero-speed automatic "neutral" for start-up and for stopping in traffic without necessitating a programmed application of reverse torque to create the required predetermined speed reversal of the web.

The many possible ramifications of this latter feature have as yet not been fully appreciated. However, the preferred hydraulic pump/motor embodiment of the invention includes a valve-regulated "by-pass" in the closed-loop hydraulic circuitry shared by the pump/motor combination that permits the control motor to be reversed by the idling speed rotation of the input gear without disengaging the first clutch.

For highway use, this improved transmission uses only a few overdrive gears in addition to the minimal functional gearing included in its single orbiter. However, persons skilled in the art will appreciate that the minimal orbital transmission of the invention can be bolstered to meet increased torque loads, without changing the gear reduction ratio provided by the web-mounted cluster gear, by the addition of one, two, or three identical cluster gears carried on the same web.

Also disclosed are (a) an optional additional known gear reduction (e.g., for large truck start-up), (b) utilization of the above-mentioned valve-regulated "by-pass" in the closed-loop hydraulic circuitry as a safety device for preventing pressure overload in the closed loop hydraulic fluid circuit connecting the hydraulic pump and motor, and (c) a power takeoff.

DRAWINGS

DETAILED DESCRIPTION

Figure 1:
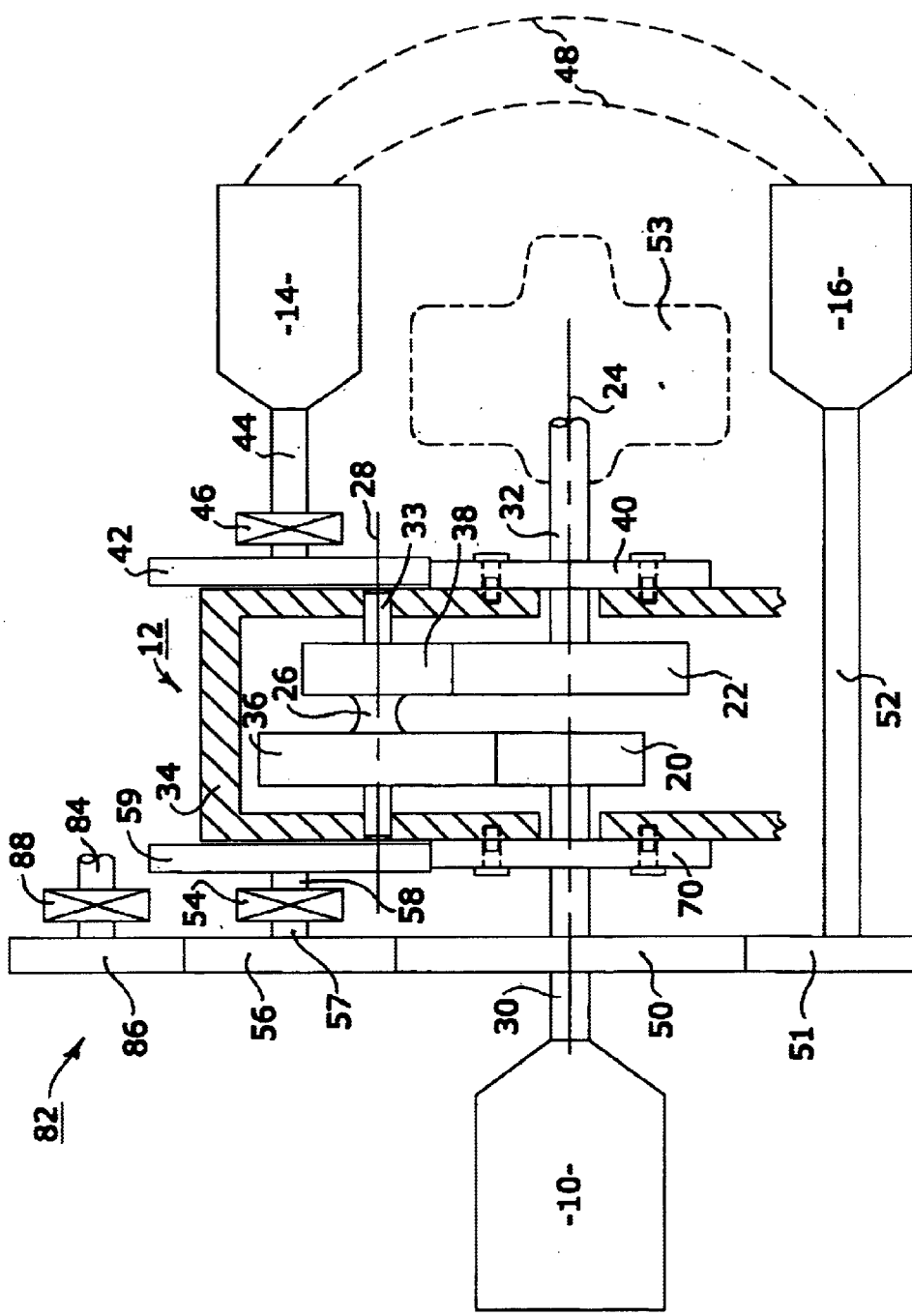
FIG. 1 is a schematic and partially cross-sectional view of the basic transmission, showing the minimal orbiter, control motor combination, and operational clutches connected to a drive engine.

Referring to FIG. 1, an engine 10 is shown connected to the invention's simple transmission that comprises only (a) a minimal orbiter 12 and (b) a control motor 14 (e.g., an electric motor or, preferably, a variable hydraulic motor) in combination with a variable hydraulic pump (or an electric generator) 16.

Orbiter 12 comprises only an input gear 20 and output gear 22, both mounted for rotation about a first axis 24, and a cluster gear 26 mounted for rotation about a second axis 28 parallel with first axis 24. Input gear 20 is fixed for rotation with the drive shaft 30 of engine 10, while output gear 22 is fixed for rotation with an output shaft 32. Cluster gear 26 is fixed to an orbit shaft 33 supported for rotation in a web 34, and web 34 is itself mounted to rotate about first axis 24, thereby permitting orbit shaft 33 and cluster gear 26 to orbit, respectively, about first axis 24, as well as about input gear 20 and output gear 22. Cluster gear 26 has two sets of gear teeth 36, 38 that mesh, respectively, with the teeth of input gear 20 and output gear 22.

The gear tooth ratios between input gear 20 and cluster gear teeth 36, and between cluster gear teeth 38 and output gear 22, are selected so that, when rotation of web 34 is prevented, output gear 22 rotates at a predetermined reduction of rotation of input gear 20. For instance, in the preferred embodiment, gear tooth ratios are selected as follows:

| Gear | No. of Teeth |
| --- | --- |
| Input gear 20 | 21 |
| Cluster gear 36 | 46 |
| Cluster gear 38 | 21 |
| Output gear 22 | 46 |

With this example, when rotation of web 34 is prevented, output gear 22 rotates at a reduction of approximately 4.8:1 of the rotation of input gear 20.

Fixed to the outside of web 34 is a gear 40 that meshes with a motor gear 42 that is connectable to motor shaft 44 by a first clutch 46 that, preferably, is a simple jaw clutch such as that shown in FIG. 2 (discussed further below). In the preferred embodiment, motor shaft 44 is driven by a hydraulic control motor 14 and, when connected by clutch 46, rotates motor gear 42 and web gear 40 in a 1:1 relationship. Control motor 14 is operated, in turn, by hydraulic fluid delivered from a hydraulic pump 16 through a "closed-loop" hydraulic circuit 48. An auxiliary drive gear 50 that is fixed to engine drive shaft 30 causes the rotation of a smaller first mating gear 51 and pump shaft 52 at a predetermined overdrive (e.g., 0.7:1). This overdrive of hydraulic pump 16 is discussed further below.

Since the operation of hydraulic pump/motor combinations is well known in the art, such operation will only be discussed generally in this disclosure. The auxiliary rotation of pump shaft 52 by engine drive shaft 30 permits hydraulic pump 16 to create a direction and flow of hydraulic fluid for control motor 14 in accordance with the adjusted angle of the swash-plate (not shown) of pump 16. While hydraulic motor 14 is also described as being variable (i.e., having a variable swash-plate), its swash-plate (not shown) is generally positioned at a predetermined angle equal to the maximum adjusted angle of the swash-plate of pump 16 so that the rotation of motor 14 varies proportionally in accordance with the direction of flow and the amount of fluid being provided at any time by pump 16 up to the maximum rotation of pump 16.

Special attention is called to the fact that when the swash-plate of pump 16 reaches its maximum adjusted angle, the speed of rotation of pump 16 and motor 14 is greater than the speed of engine drive shaft 30 and input gear 20 by the predetermined overdrive explained above. The operation of control motor 14 controls the rotation of web 34 and determines the continuous and infinitely-variable gear ratios of this improved transmission.

Forward Operation of IVT

When first clutch 46 is engaged, control motor 14 is connected to web 34; and, if the swash-plate of pump 16 is set at 0°, the rotation of pump shaft 52 results in no movement of hydraulic fluid out of pump 16. This stops all flow of fluid through closed-loop 48 and locks control motor 14 against all movement, thereby preventing rotation of web 34 and causing output gear 22 to rotate only at the predetermined low gear ratio determined by the selection of the number of teeth in the gears as just noted above.

It will be understood by those skilled in the art that, should the predetermined low gear ratio be insufficient for very large trucks, an additional gear reduction can be added as indicated by the dotted lines 53.

When the adjusted angle of the swash-plate of pump 16 is continuously increased in a positive direction, hydraulic fluid begins to move through loop 48, continuously increasing the rotation of control motor 14 and, in turn, the rotation of web 34 in a forward direction. As the speed of rotation of motor 14 and web 34 continuously increases, the predetermined reduction of the speed of rotation of output gear 22 (relative to the speed of input gear 20) is continuously and infinitely diminished proportional to the changing speed of rotation of web 34 until output gear 22 is finally rotating faster than the speed of input gear 20 by the predetermined overdrive of pump 16 and motor 14 by gears 50 and 51, as explained above (e.g., output shaft 32 is turning 0.7:1 with engine drive shaft 30).

Therefore, with the gear teeth in the example above, as the speed of rotation of motor 14 and web 34 continuously increases, the rotation of output shaft 32 continuously increases in speed through an infinite number of gear ratios from 4.8:1 to an overdrive of 0.7:1 without any shifting or any increase in engine speed.

Special attention is called to the fact that this just-described continuous and infinite-progression gear ratio change (from the predetermined low gear ratio up to overdrive) occurs without any change in the speed of engine 10. That is, during the testing of the Gleasman IVT referred to in the Background section above, the speed of the vehicle engine was only increased from an idling speed of 850 rpm up to an initial operational speed of about 1800 rpm. This increase is relatively slight compared to the usual increases in engine speed (up to 2500–3000+ rpm) required for each successive shift between conventional gear ranges of either manual or automatic transmissions. The engine was maintained at this relatively low and efficient operational level throughout the entire acceleration from a standing stop up to overdrive. This remarkable feature not only results in fuel savings but, more importantly, in significant reduction in pollution. This is particularly true for diesel engine vehicles, since the engine's selected operational speed can be predetermined at a "sweet spot" which optimizes performance; and, as is well known, when a diesel engine operates at a constant speed, it discharges little, if any, pollutants.

Special Overdrive

As part of a special overdrive arrangement for this transmission, auxiliary drive gear 50 is also in mesh with a second mating gear 56 that is identical to first mating gear 51 and, thus, rotates at the same predetermined overdrive (e.g., 0.7:1) at which gear 51 is driven by auxiliary drive gear 50. However, gear 56 initially "free-wheels", being disconnected from the rest of the transmission by a second clutch 54 that is normally disengaged. When engaged, second clutch 54 connects shafts 57, 58 and, thereby, causes an overdrive gear 59 to rotate with gear 56 at the same predetermined overdrive.

Figure 2:
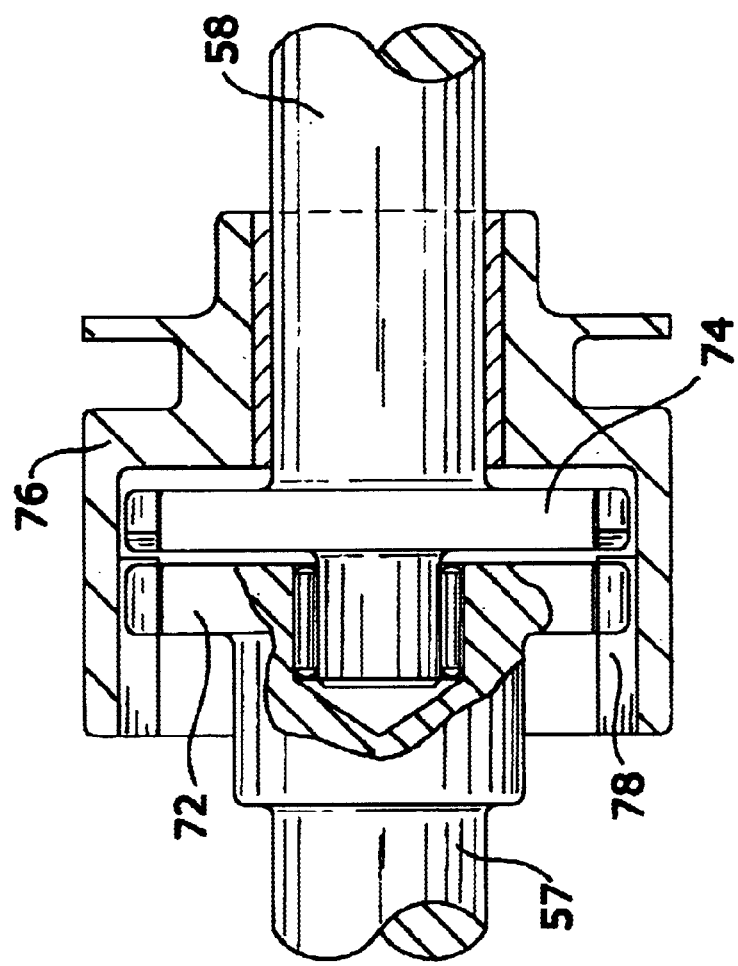
FIG. 2 is a schematic and partially cross-sectional view of the jaw clutch illustrated only symbolically in FIG. 1.

Second clutch 54 is preferably a simple jaw clutch such as that shown in FIG. 2. Fixed to the respective ends of connecting shafts 57, 58 are respective spur gears 72, 74. A sliding jaw 76, which is loosely mounted over shaft 58, has internal mating spur teeth 78. In the position shown, internal teeth 78 are in mesh with only the teeth of spur gear 72 so that jaw 76 rotates only with spur gear 72 and shaft 57, rotating freely over the surface of shaft 58 and permitting the shafts to rotate independently of each other. However, when jaw 76 is moved to the right, its internal teeth enter into mesh with the teeth of spur gear 74 as well as maintaining their meshing relationship with the teeth of spur gear 72, thereby engaging a connection between shafts 57 and 58.

As discussed above, when pump 16 and motor 14 reach their matched maximum speeds of rotation, the rotation of web 34 has continually increased up to the speed of input gear 20 and then faster than the speed of input gear 20 by the predetermined overdrive of pump 16 and motor 14 by gears 50 and 51. At this point, output gear 22 is also rotating faster than the speed of input gear 20 by the same predetermined overdrive (e.g., output shaft 32 is turning 0.7:1 relative to engine drive shaft 30) as explained above.

Next, first clutch 46 is disengaged, and second clutch 54 is engaged. This releases the connection between web 34 and control motor 14 and, at the same time, connects overdrive gear 59 to rotate with gear 56. Overdrive gear 59 is in 1:1 mesh with a second web gear 70 that, like first web gear 40, is also fixed to web 34 but on the opposite side. As explained above, gear 56 is rotated by auxiliary drive gear 50 at the same predetermined overdrive (e.g., 0.7:1) as are gear 51, pump 16, motor 14, and first web gear 40.

Therefore, at the moment clutches 46 and 54 are, respectively, disengaged and engaged, web 34, web gears 40 and 70, as well as gears 56 and 59, are all rotating at 0.7:1 relative to engine drive shaft 30, thereby greatly facilitating the operation of the clutches. This just-described activation of the invention's overdrive causes web 34, output gear 22, and output shaft 32 to all lock up with gear 56, thereby creating a totally mechanical overdrive connection between engine drive shaft 30 and output shaft 32; and, at the same time, the transmission's hydraulic system is completely disengaged from web 34. Therefore, those skilled in the art will appreciate that the swash-plate of pump 16 is at this time readjusted to its 0° position so that the rotation of pump shaft 52 produces no movement of hydraulic fluid out of pump 16, thereby stopping all flow of fluid through closed-loop 48 and locking control motor 14 against all movement. Thus, the hydraulic system ceases to function, and its load on engine 10 is minimal.

As indicated earlier, hydraulic motor 14 may be variable. Therefore, an alternative overdrive arrangement could be achieved by adjusting the swash-plate of motor 14 relative to its normal setting referred to above.

"Stopping" and Rearward Operation of IVT

If the angle of the swash-plate of pump 16 is moved to a slightly negative setting (e.g., 1–3°), control motor 14 will rotate in the opposite ("rearward") direction at some predetermined relatively slow speed that will cause output gear 22 to come to a full stop. Since this slow speed operation of control motor 14 is being produced by the flow of hydraulic fluid, this in effect provides a "geared neutral" in which web 34 is held by a constant torque in a stopped position for start-up and when stopping in traffic.

When the setting of the swash-plate of pump 16 is continuously increased in a negative direction (i.e., beyond the slightly negative setting used to bring output gear 22 to a stop), rotations of control motor 14, web 34, output gear 22, and output shaft 32 all continuously increase in the rearward direction. However, as mentioned above, working with experimental models has revealed a surprising and potentially valuable feature relating to the minimal orbiter of this novel transmission: We learned serendipitously that, if control motor 14 is "neutralized" (e.g., by disengaging first clutch 46), an idling-speed rotation of the input gear 20 will automatically cause cluster gear 26 to rotate web 34 in the rearward direction at the exact speed that causes output gear 22 to come to a complete stop. That is, when rotational control of the web is neutralized, the minimal orbiter of this invention automatically seeks the position of minimum torque.

Therefore, it may not be necessary to precisely program the adjustment of the swash-plate of pump 16 in order create the required predetermined speed reversal of the web for bringing the transmission to zero speed when stopping the vehicle. While we continue to explore the many possible ramifications of this latter feature, we have already developed a preferred hydraulic pump/motor embodiment for the invention that, without disengaging first clutch 46, still permits control motor 14 to be reversed appropriately to allow the vehicle to come to a complete stop whenever the speed of input gear 20 is reduced to idling engine speed.

Hydraulic By-Pass Circuit

Figure 3:
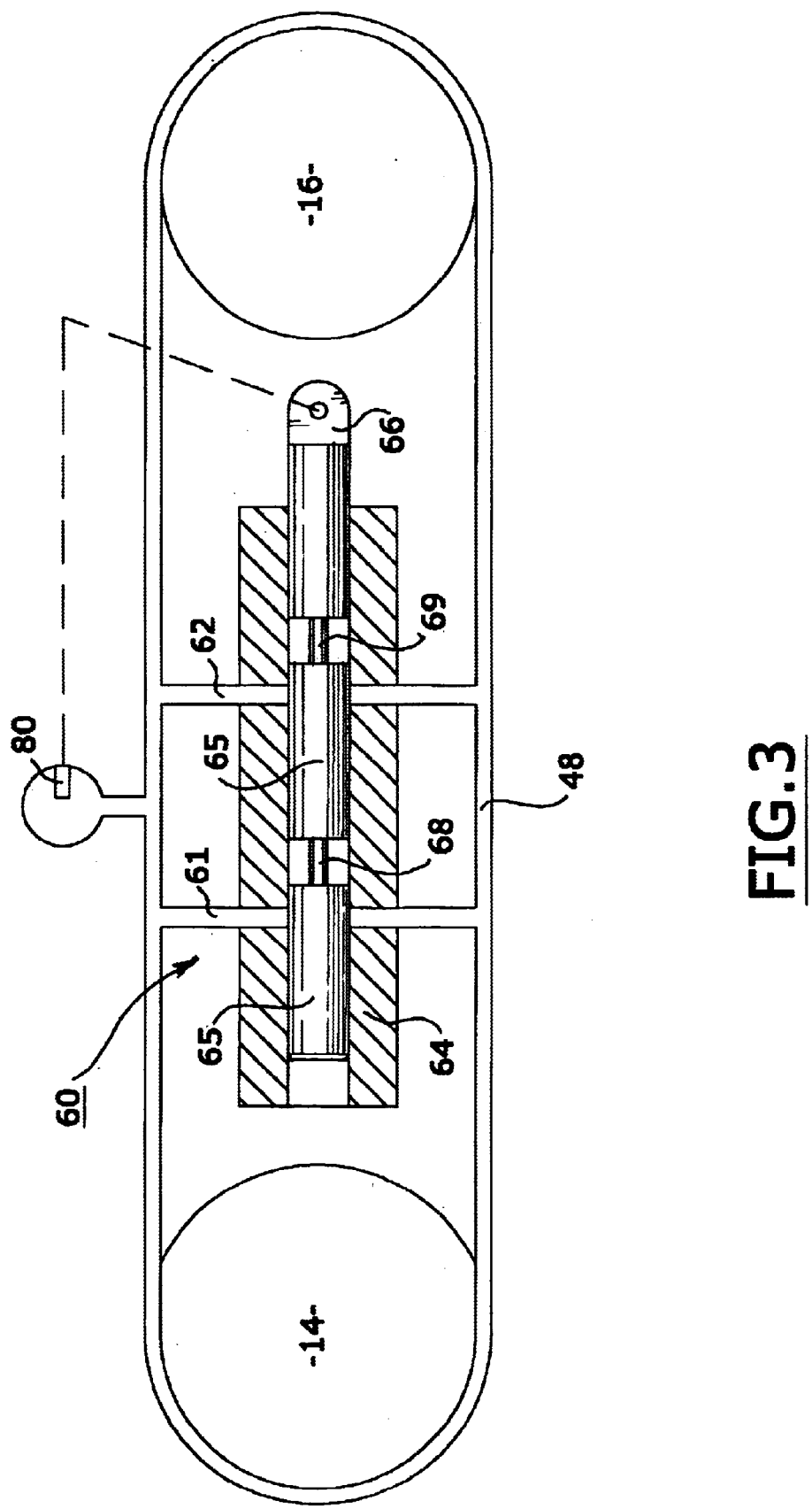
FIG. 3 is a schematic and partially cross-sectional view of one embodiment of the hydraulic control pump/motor combination, showing the closed-loop hydraulic circuitry with the valve-regulated "by-pass" of the invention.

Reference is made to FIG. 3 which shows a valve-regulated "by-pass" assembly 60 incorporated in closed-loop hydraulic circuitry 48 shared by pump 16 and motor 14. A pair of "by-pass" passageways 61, 62 connect the opposite sides of closed-loop 48 and pass through a cylinder 64, being blocked by the piston portions 65 of a spool valve 66. A pair of stems 68, 69 are located on spool valve 66 so that, when spool valve 66 is moved to the left in the direction of the arrow, stems 68, 69 permit hydraulic fluid to flow through by-pass passageways 61, 62. A sensor 80 is responsive to upper and lower levels in selected parameters of vehicle operation (e.g., vehicle speed and/or hydraulic pressure in closed-loop 48). Sensing a first level of these selected parameters causes spool valve 66 to move to the left to open passageways 61, 62 (e.g., whenever the vehicle speed is reduced and approaches a stopped condition), while sensing a second level restores valve 66 to the position illustrated, returning closed-loop hydraulic circuit 48 to its normal condition.

Activation of spool valve 66 to the left permits shaft 44 of control motor 14 to be moved independently even though the swash plate of pump 16 is being driven or is being held stopped at 0°. Therefore, by-pass assembly 60 can be used to reduce the load of the transmission during engine start-up, thereby replacing a vehicle's fly-wheel clutch. In this regard, since sensor 80 can be used to sense a significant change in fluid pressure in closed-loop hydraulic circuit 48, by-pass assembly 60 can also serve as a safety device, preventing any exceptional overload of the hydraulic system.

Power Takeoff

As is well known in the art, power takeoff shafts are often provided on tractors and trucks to permit auxiliary equipment to be operated from the vehicle's engine. Therefore, one other feature of this new transmission is the simple power takeoff assembly 82 that includes a power takeoff shaft 84 and a power takeoff gear 86 connected by a third jaw clutch 88.

Power takeoff gear 86 is driven by second mating gear 56 that, as explained above, rotates at a predetermined overdrive (e.g., 0.7:1). Power takeoff gear 86 generally "freewheels", being disconnected from power takeoff shaft 84 by normally disengaged clutch 88. However, when clutch 88 is engaged, power takeoff shaft 84 also rotates at the predetermined overdrive to operate auxiliary equipment.

While the preceding description discloses the invention as being primarily appropriate for automotive use, those skilled in the art will appreciate that it is equally appropriate for controlling the output of industrial-type engines.

We claim:

1. A transmission for a primary engine, said transmission comprising:

only a single orbiter having:
        an input gear mounted on a first axis and responsive to an input drive provided by said primary engine,
        an output gear mounted on said first axis, and
        at least one cluster gear meshed with only said input and output gears and mounted for rotation on an orbit shaft positioned parallel with said first axis,
        said orbit shaft being supported in a web mounted for rotation about said first axis to permit said orbit shaft and said cluster gear to orbit, respectively, said first axis and said input and output gears, and
        the gear tooth ratios between said cluster gear and said input and output gears are selected so that, when rotation of said web is prevented, rotation of said input gear produces rotation of said output gear at a predetermined reduction of said input drive; and a rotational control operatively connectable to said orbiter web so that:
        preventing the rotation of said web causes said output gear to rotate solely at said predetermined reduction of said input drive,
        rotating said web in a first direction causes said predetermined reduction of said output gear relative to said input drive to be diminished proportional to the speed of rotation of said web, and
        permitting rotation of said web in the opposite direction at a predetermined speed stops the rotation of said output gear.

2. The transmission of claim 1 wherein said rotational control is a motor.

3. A continuously and infinitely variable transmission for connecting an engine drive with an output drive shaft comprising:

an orbiter connectable between said engine drive and said output drive shaft, said orbiter varying said engine drive throughout a continuum from a predetermined low gear reduction up to said engine drive;

said orbiter having only (i) an input gear mounted on a first axis and connected to said engine drive, (ii) an output gear mounted on said first axis and connected to said output drive shaft, (iii) at least one cluster gear meshed with only said input and output gears and mounted for rotation on an orbit shaft positioned parallel with said first axis, (iv) a web supporting said orbit shaft for rotation about said first axis to permit said orbit shaft and said cluster gear to orbit, respectively, said first axis and said input and output gears; and (v) said gear tooth ratios between said cluster gear and said input and output gears being selected so that, when rotation of said web is prevented, rotation of said input gear produces rotation of said output gear at said predetermined low gear reduction; and a control motor driven by said engine drive for controlling rotation of said orbiter web so that (a) preventing rotation of said web causes said output gear to rotate relative to said input drive solely at said predetermined low gear reduction, (b) rotating said web in a first direction diminishes said predetermined low gear reduction proportional to the speed of rotation of said web, (c) permitting rotation of said web in the opposite direction at a predetermined speed stops the rotation of said output gear, and (d) rotating said web in said opposite direction at greater than said predetermined speed causes said output gear to rotate opposite to the rotation of said input drive.

4. The transmission of claim 3 further comprising:
a first clutch connecting said control motor and said orbiter web;
a second clutch connecting said engine drive and said orbiter web;
a first overdrive positioned between said engine drive and said second clutch; and
said clutches being selectively operable so that:
when said first clutch is engaged and said second clutch is disengaged, the rotation of said orbiter web is controlled by said control motor, and
when said second clutch is engaged and said first clutch is disengaged, said orbiter web rotates at said predetermined overdrive, thereby providing said output drive shaft with an overdrive relative to said engine drive.

5. The transmission of claim 3 wherein said control motor is an electric motor and further comprising:
a generator driven by said engine drive and, in turn, producing an output current for driving said electric control motor.

6. The transmission of claim 4 wherein said control motor is a hydraulic motor and further comprising:
a hydraulic pump driven by said engine drive and, in turn, producing a hydraulic output for driving said hydraulic control motor so that as said pump increases to a top speed of rotation, said motor also increases to said top speed of rotation.

7. The transmission of claim 6 further comprising:
a second overdrive positioned between said engine drive and said hydraulic pump for driving said hydraulic pump at said same predetermined overdrive relative to said engine drive as said web is driven by said first overdrive;
so that, when said hydraulic pump and said hydraulic motor each reach said top speed of rotation, said first overdrive also rotates at the same speed facilitating the engagement of said second clutch and the disengagement of said first clutch to provide said output drive shaft with said overdrive relative to said engine drive.

8. The transmission of claim 6 wherein said hydraulic pump has a hydraulic output that is adjustable relative to said engine drive so that the speed of said hydraulic motor is adjustable relative to said hydraulic output of said hydraulic pump.

9. The transmission of claim 3 further comprising a further gear reduction connected between said output gear and said output axle for further reducing said predetermined low gear reduction.

10. The transmission of claim 6 further comprising:
a closed loop hydraulic circuit connecting said hydraulic pump and said hydraulic motor; and
a pair of parallel by-pass circuits interposed within said closed loop, each said by-pass circuit being selectively closed by a valve so that, when both by-pass circuits are closed, the circulation of hydraulic fluid through said closed loop is unaffected;
said by-pass circuits being selectively opened (a) to permit hydraulic fluid to circulate directly from said motor back to said motor without circulating through said pump and (b) to permit hydraulic fluid to circulate directly from said pump back to said pump without circulating through said motor.

11. The transmission of claim 10 further comprising a sensor associated with said closed loop for opening said by-pass valves when said sensor is activated by a predetermined first level of a selected parameter and for closing said by-pass valves when said sensor responds to a predetermined second level of said selected parameter.

12. The transmission of claim 11 wherein said sensor responds to hydraulic pressure for opening said by-pass valves when the fluid pressure within said closed loop reaches a predetermined upper level and for closing said by-pass valves when the fluid pressure within said closed loop reaches a predetermined lower level.

13. The transmission of claim 10 further comprising a piston valve for opening and closing said pair of parallel by-pass circuits.

14. The transmission of claim 7 wherein said first and second overdrives each comprise a single gear driven by a larger gear fixed to said engine drive, said single gears being identical and being driven by said same larger gear.

15. The transmission of claim 4 wherein said engine drive is maintained at one of (a) an idling speed and (b) a preferred operating speed at all times when said first clutch is engaged and said second clutch is disengaged.

16. The transmission of claim 15 wherein, when said engine drive is maintained at said idling speed and said first clutch is disengaged, said web rotates in said opposite direction, automatically seeking said predetermined speed where rotation of said output gear stops.

17. The transmission of claim 4 further comprising:
a power takeoff assembly having a power takeoff shaft and a power takeoff gear driven by said first overdrive; and
a third clutch connecting said power takeoff gear and said power takeoff shaft;
so that, only when said third clutch is engaged, said power takeoff shaft and a power takeoff gear are both driven by said first overdrive.

* * * * *